United States Patent
Gladstone (10) Patent No.: US 8,325,018 B2
(45) Date of Patent: Dec. 4, 2012

(54) METHOD AND APPARATUS TO REDUCE DATA LOST ON PERSONAL MOBILE DEVICES

(75) Inventor: Philip J. S. Gladstone, Carlisle, MA (US)

(73) Assignee: Cisco Technology, Inc., San Jose, CA (US)

( * ) Notice: Subject to any disclaimer, the term of this patent is extended or adjusted under 35 U.S.C. 154(b) by 874 days.

(21) Appl. No.: 12/399,022

(22) Filed: Mar. 6, 2009

(65) Prior Publication Data

US 2010/0225451 A1   Sep. 9, 2010

(51) Int. Cl.
*H04Q 5/22* (2006.01)
(52) U.S. Cl. .............. 340/10.5; 340/10.1; 340/10.2; 340/10.3; 340/10.4; 340/572.1; 340/572.2; 340/572.3; 340/572.4; 340/572.5; 235/375; 235/376; 235/377; 235/378; 235/379; 235/380; 235/381; 235/382; 235/384; 235/385
(58) Field of Classification Search ........ 340/10.1–10.5, 340/572.1–572.9; 235/375–385
See application file for complete search history.

(56) References Cited

U.S. PATENT DOCUMENTS

| | | | | |
|---|---|---|---|---|
| 2005/0020279 A1* | 1/2005 | Markhovsky et al. | ..... | 455/456.1 |
| 2007/0046467 A1* | 3/2007 | Chakraborty et al. | ..... | 340/572.1 |

* cited by examiner

*Primary Examiner* — George Bugg
*Assistant Examiner* — Ojiako Nwugo
(74) *Attorney, Agent, or Firm* — P. Su (57) ABSTRACT

Methods and apparatus for providing security for mobile devices are disclosed. In one embodiment, a method includes maintaining responsibility for a first item when the first item is in a first range of a first container. Maintaining responsibility for the first item includes monitoring a locator tag associated with the first item when the locator tag is within the first range. The method also includes determining when the first item is in the first range, determining if the first item is in a second range associated with a second container when the first item is not in the first range, and determining if the second container is trusted with respect to the first container if the first item is in the second range. Additionally, the method includes transferring responsibility for the first item to the second container if the second container is trusted with respect to the first container.

24 Claims, 10 Drawing Sheets

METHOD AND APPARATUS TO REDUCE DATA LOST ON PERSONAL MOBILE DEVICES

BACKGROUND OF THE INVENTION

The present invention relates generally to efficiently keeping track of items associated with an owner.

People often own and carry multiple portable devices, such as laptop computers, smart phones, cellular phones, digital media devices, cameras, and computer memory devices. In addition, people typically also carry purses, wallets, and the like. Hence, it is generally difficult for a person to keep track of all of the items he possesses, as items may be misplaced as the person transits between different locations. As the use of portable devices increases, the number of portable devices that are stolen or otherwise misplaced is also increasing.

In some cases, misplacing a device may mostly be inconvenient. By way of example, misplacing a cellular phone may result in the inconvenience having to deactivate the lost cellular phone, and having to activate a replacement cellular phone. In other cases, misplacing a device may potentially be devastating. For instance, losing a laptop that holds significant amounts of confidential information may pose a serious security risk to the owner.

BRIEF DESCRIPTION OF THE DRAWINGS

The invention will be readily understood by the following detailed description in conjunction with the accompanying drawings, wherein like reference numerals designate like structural elements, and in which.

DESCRIPTION OF EXAMPLE EMBODIMENTS

General Overview

In one embodiment, a method includes maintaining responsibility for a first item when the first item is in a first range of a first container. Maintaining responsibility for the first item includes monitoring a locator tag associated with the first item when the locator tag is within the first range. The method also includes determining when the first item is in the first range, determining if the first item is in a second range associated with a second container when the first item is not in the first range, and determining if the second container is trusted with respect to the first container if the first item is in the second range. Additionally, the method includes transferring responsibility for the first item to the second container if the second container is trusted with respect to the first container.

Description

Tagging items, e.g., portable electronic devices, such that the items may be tracked reduces the likelihood that the items will be lost or stolen. In one embodiment, a managing device may monitor the presence of a tagged item within a particular range, and notify an appropriate party, e.g., an owner or a user, when the tagged item has left the particular range. By effectively immediately alerting an owner when a tagged item is no longer within a range monitored by a managing device, the owner may efficiently ascertain what has happened to the tagged item.

When an owner is alerted that a tagged item is no longer in the range of a particular managing device, the owner may take appropriate steps to recover the tagged item. For example, if the owner is alerted that he or she has left a portable electronic device behind when he or she left a particular location, he or she may return to that particular location and recover the portable electronic device. Alternatively, when an owner is alerted that a tagged item is no longer in the range of a particular managing device, the owner may hand off or otherwise transfer ownership of the tagged item to a different managing device, e.g., a managing device with a range that encompasses the current location of the tagged item. For instance, an owner may discover that a tagged item is no longer in the range monitored by a first managing device, and effectively reassign responsibility for monitoring the tagged item to a second managing device.

A managing device may be associated with a container. In general, a container may be substantially any entity which may effectively possess a tagged item. By way of example, a person may be a container. Other examples of a container include, but are not limited to including, objects such as a cars, suitcases, briefcases, purses, homes, storage areas, and/or safes.

Figure 1:
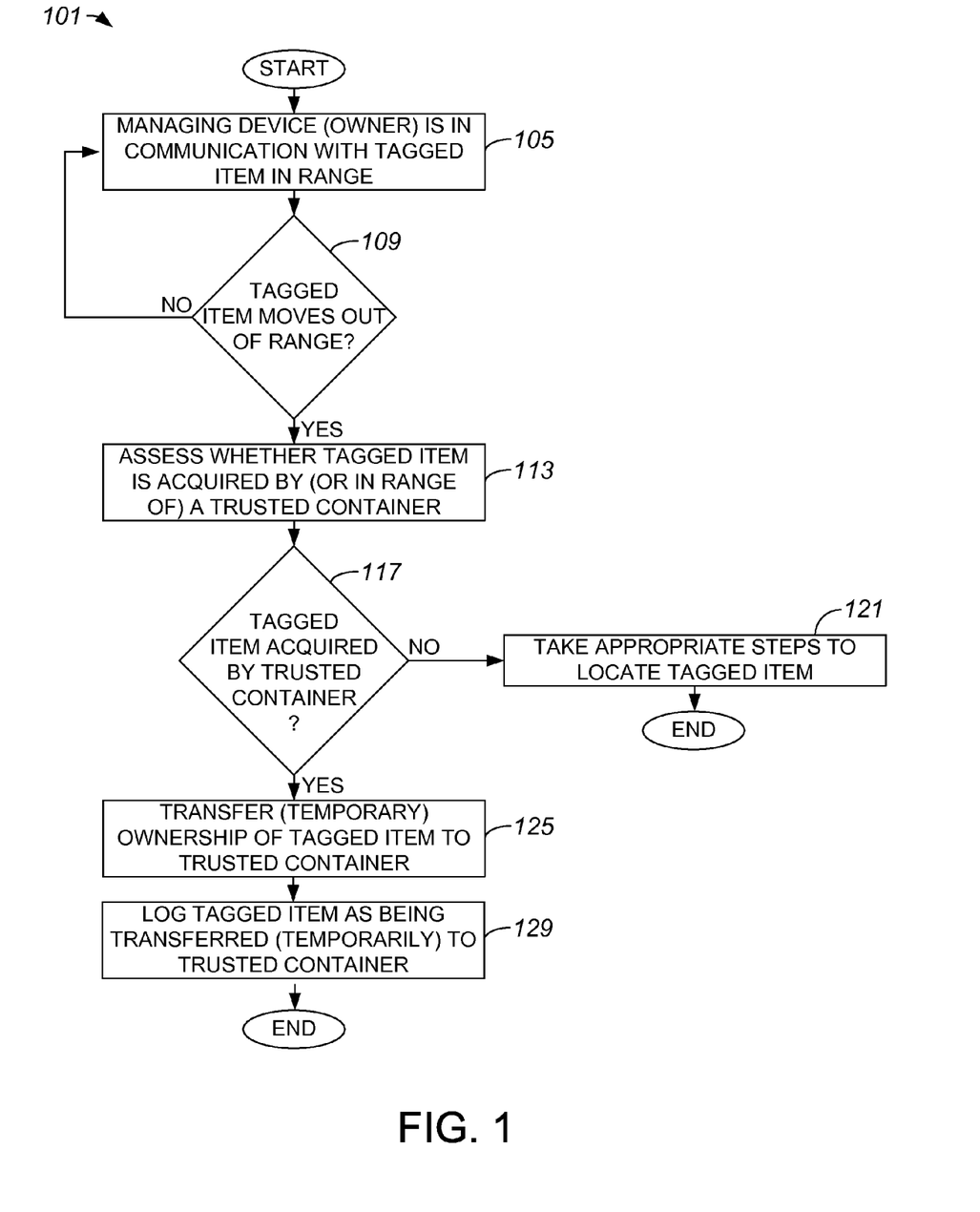
FIG. 1 is a process flow diagram which illustrates a process of operating a tracking system in accordance with an embodiment of the present invention.

Referring initially to FIG. 1, a process of operating a tracking system will be described in accordance with an embodiment of the present invention. A process 101 of operating a tracking system begins at step 105 in which a managing device is in communication with a tagged item, i.e., a tagged item within the range of the managing device. The managing device is typically associated with a container, as for example an owner of the tagged item. In one embodiment, the container may effectively be a person who owns the device, and the managing device may be a handheld computing device that that manages or otherwise monitors the actual possession of the tagged item. That is, the managing device may effectively keep tabs on the current location of the tagged item by tracking whether there is any hand-off of responsibility for the tagged item.

The managing device may monitor the tagged item, e.g., a portable device, through at least periodic communications with the portable device. The managing device may communicate with the tagged item using substantially any suitable method including, but not limited to, radio frequency (RF) communications and/or wireless communications such as WiFi communications. It should be appreciated that when RF communications are used, the tagged item may include a RF identification (RFID) tag.

The range associated with the managing device may vary widely. In one embodiment, the range is a perimeter of the managing device. By way of example, when the managing device is associated with a container that is a person, the range may be a radius defined around the managing device. Alternatively, when the managing device is associated with a container such as a car or a safe, the range may be defined by the external edges of the car or the safe.

In step 109, a determination is made as to whether the tagged item has moved out of range of the managing device. An indication that the tagged item has moved out of range may be effectuated in a variety of different ways. If the tagged item has moved out of range, the managing device may fail to receive any communications from the tagged item, or may fail to sense the tagged item within the range. When the managing device determines that the tagged item has moved out of range, an alarm may sound that may be heard by an owner, a phone call may automatically be placed to the owner, and/or an e-mail notification may be sent to the owner. The manner used to effectively alert the managing device to the fact that the tagged item has moved out of range may vary widely, and may be specified as a policy associated with the managing device.

When the determination in step 109 is that the tagged item has not moved out of range, the indication is that the managing device is still in communication with the tagged item. Accordingly, process flow returns to step 105 in which the managing device continues to communicate with the tagged item.

Alternatively, if it is determined in step 109 that the tagged item has moved out of range, an assessment is made as to whether the tagged item has effectively been acquired by, or otherwise in a monitoring range associated with, a trusted container in step 113. In one embodiment, the managing device determines whether there is a trusted container, e.g., another person with managing capabilities, with a range within which the tagged item is located. In general, assessing whether a tagged item is acquired by a trusted container may include essentially polling accessible containers, e.g., containers in the same general area or containers that are a part of the same overall network as the managing device. Steps associated with one method of determining whether the tagged item has been acquired by a trusted container will be described below with respect to FIG. 2.

In step 117, it is determined whether the tagged item has been acquired by a trusted container. If it is determined that the tagged item has not been handed off to a trusted container, the implication may be that the tagged item is not able to be tracked using the tracking system. By way of example, a tagged item that has been dropped on the ground or stolen has not been acquired by a trusted container. In addition, the tagged item may have been acquired by an untrusted container such as a thief. As such, process flow moves to step 121 in which appropriate steps are taken to locate the tagged item. Such appropriate steps may include, but are not limited to including, calling authorities to report the tagged item as being stolen and/or physically searching for the tagged item. Once the appropriate steps are taken to locate the tagged item, the process of operating a tracking system is completed.

If, however, the determination in step 117 is that the tagged item has been acquired by a trusted container, ownership of the tagged item is at least temporarily transferred to the trusted container in step 125. That is, temporary ownership is provided to the trusted container by the managing device. In general, transferring ownership may include providing the trusted container with a private key or, more generally, a cryptographic identifier, that is associated with the trusted container. One suitable method of transferring ownership of the tagged item to the trusted container will be discussed below with respect to FIG. 3. It should be appreciated that in the event that the trusted container is not capable of receiving a private key, transferring ownership of the tagged item may include generally communicating with the trusted container to inform the trusted container that it has ownership of the tagged item.

After ownership of the tagged item is at least temporarily transferred, the tagged item is logged as being transferred in step 129 to the trusted container. Such a log may be created and maintained by the managing device, and may be updated to indicate that the private key for the tagged item has been provided to the trusted container, and that the trusted container has ownership of, e.g., responsibility for the monitoring of, the tagged item. For an embodiment in which the trusted container is not arranged to receive a private key, logging the tagged item as being transferred may involve updating the log to indicate that the trusted container is currently in physical possession of the tagged item. Upon logging the tagged item as being transferred to the trusted container, the process of operating a tracking system is completed.

Figure 2:
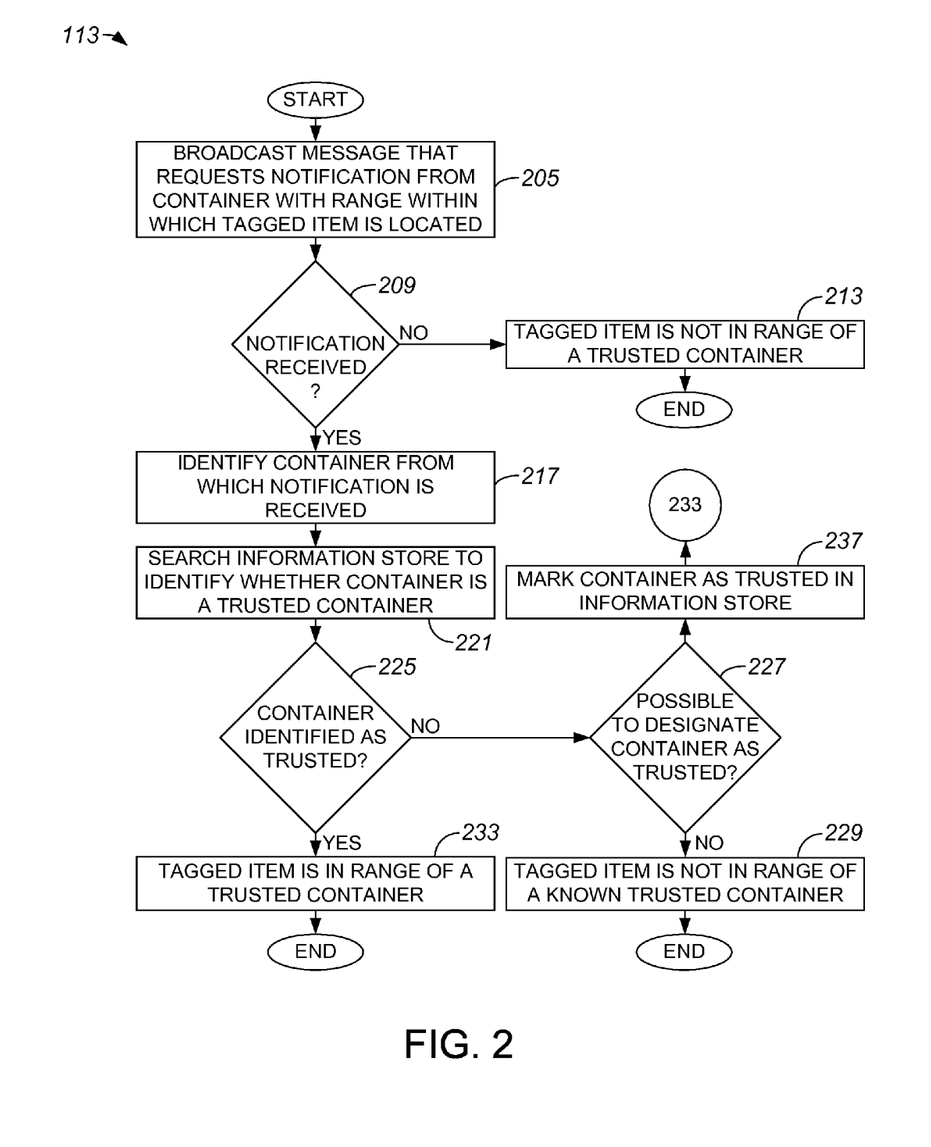
FIG. 2 is a process flow diagram which illustrates a process of assessing whether a tagged item is being monitored by a trusted container, e.g., step 113 of FIG. 1, in accordance with an embodiment of the present invention.

As previously mentioned, when a managing device which has responsibility for a tagged item determines that the tagged item is no longer in a range monitored by the managing device, the managing device may assess whether the tagged item has been acquired by a trusted container. FIG. 2 is a process flow diagram which illustrates a process of assessing whether a tagged item is being monitored by a trusted container, e.g., step 113 of FIG. 1, in accordance with an embodiment of the present invention. A process 113 of assessing whether the tagged item is in the range of a trusted container begins at step 205 in which the managing device broadcasts a message that requests notification from a container with a range in which the tagged item is currently located. In one embodiment, the managing device, i.e., the container which currently has responsibility for monitoring the tagged item, sends a message which effectively asks if any containers have the tagged item within their associated ranges. It should be appreciated that some containers may be arranged to automatically sense when a tagged item has entered a particular range, while other containers may initiate a search for the tagged item when the message is obtained.

Typically, if a container determines that the tagged item is within its range, the container will notify the managing device. As such, a determination is made in step 209 as to whether a notification, e.g., a notification regarding the location of the tagged item, has been received. Such a notification, if received, may be received substantially directly from the actual container within whose range the tagged item is located, or from a container which has responsibility for the actual container in whose range the tagged item is located.

If it is determined in step 209 that a notification regarding the location of the tagged item has not been received, the indication is that the tagged item is not in a monitoring range associated with a trusted container. As such, the tagged item is assessed in step 213 as not being in range of a trusted container, and the process of assessing whether the tagged item is in range of a trusted container is completed. It should be appreciated that the tagged item may either be in range of an untrusted, e.g., unknown or rogue, container or may fail to be in the range of any container, trusted or otherwise.

Alternatively, if it is determined in step 209 that a notification regarding the location of the tagged item has been received, the container from which the notification was received is identified in step 217. Such a container is generally either trusted or unknown. An unknown container may be a new container which has yet to be recognized as being trusted. Once such a container is identified in step 217, an information store is searched in step 221 in order to identify whether the container is a trusted container. The information store may be associated with the managing device that broadcasted the message in step 205.

A determination is made in step 225 as to whether the container is identified in the information store as being trusted. If it is determined that the container is identified as being trusted, the tagged item is assessed as being in the range of a trusted container in step 233, and the process of assessing whether the tagged item is in the range of a trusted container is completed.

If, however, it is determined in step 225 that the container is not identified in the information store as being trusted, process flow moves to step 227 in which a determination is made regarding whether it is possible to designate the container as trusted. Determining whether it is possible to designate the container as trusted may include considering a variety of factors including, but not limited to including, the identify of the container, the type associated with the container, and/or the location of the container. When the determination is that it is not possible to designate the container as trusted, as for example because there is insufficient information to make such a designation, the tagged item is assessed in step 229 as not being in the range of a known trusted container, and the process of assessing whether the tagged item is in the range of a trusted container is completed.

Alternatively, if it is determined in step 227 that it is possible to designate the container is trusted, the container is marked in the information store as being trusted in step 237. Then, process flow moves to step 233 in which the tagged item is assessed as being in the range monitored by a trusted container.

Figure 3:
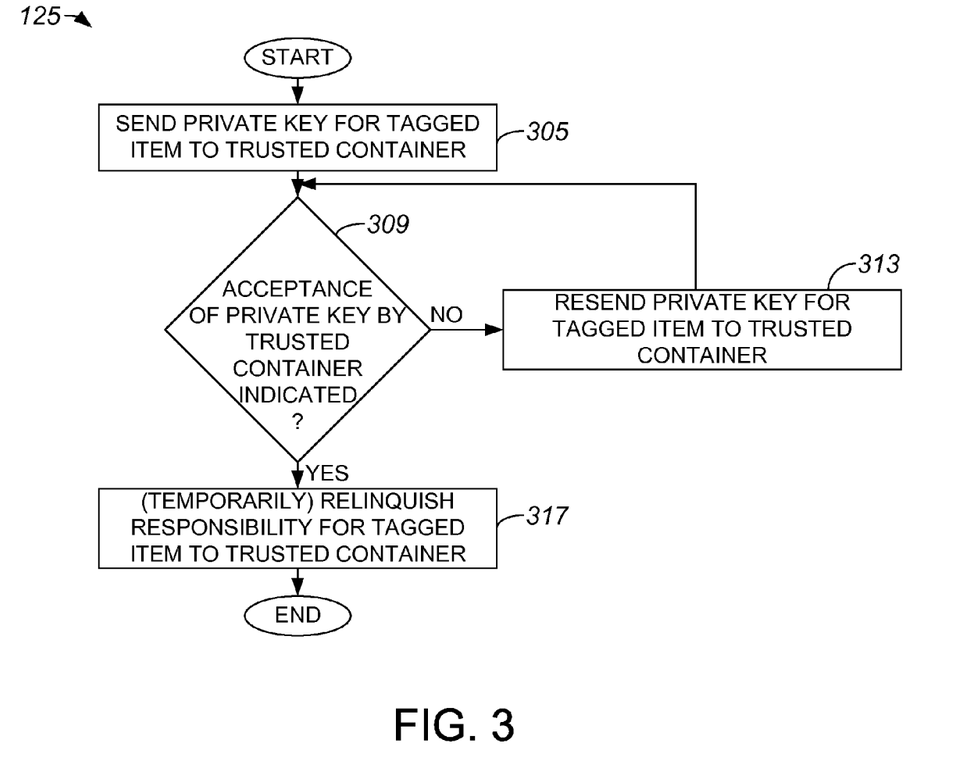
FIG. 3 is a process flow diagram which illustrates a process of at least temporarily transferring ownership of a tagged item from one trusted container to another, e.g., step 125 of FIG. 1, in accordance with an embodiment of the present invention.

With reference to FIG. 3, a process of at least temporarily transferring ownership of a tagged item from one trusted container to another, e.g., step 125 of FIG. 1, will be described in accordance with an embodiment of the present invention. A process 125 of at least temporarily transferring ownership of a tagged item begins at step 305 in which a private key associated with the tagged item is sent or otherwise provided to a trusted container. Substantially any suitable communications technique, e.g., a wireless communications method, may be used to provide the private key to the trusted container.

In step 309, it is determined whether the private key has been accepted by the trusted container. An acceptance may be indicated by the receipt of a notification from the trusted container. Such an acceptance may be arranged to indicate the acceptance of responsibility for monitoring the tagged item. If it is determined that acceptance of the private key by the trusted container is not indicated, the private key is resent in step 313, and process flow returns to step 309 and the determination of whether acceptance of the private key by the trusted container is indicated. In the described embodiment, it is assumed that the private key is eventually accepted for ease of discussion, although it should be appreciated that the trusted container may fail to accept the private key in some instances. By way of example, if the tagged item has moved out of the monitoring range of the trusted container by the time the private key is received by the trusted container, or if the trusted container is incapable of monitoring the tagged item, the trusted container may reject the private key.

If it is determined in step 309 that acceptance of the private key by the trusted container is indicated, responsibility for the tagged item is at least temporarily relinquished to the trusted container in step 317. The process of at least temporarily transferring ownership of a tagged item is completed.

When a tagged item enters the range of a container, responsibility for effectively monitoring the tagged item may be acquired by the container. For example, if a person with a managing device picks up a portable electronic device, the person may acquire responsibility for monitoring the portable electronic device. When such the person then places the portable electronic device in a safe, responsibility for monitoring the portable electronic device may be transferred from the person to the safe.

Figure 4:
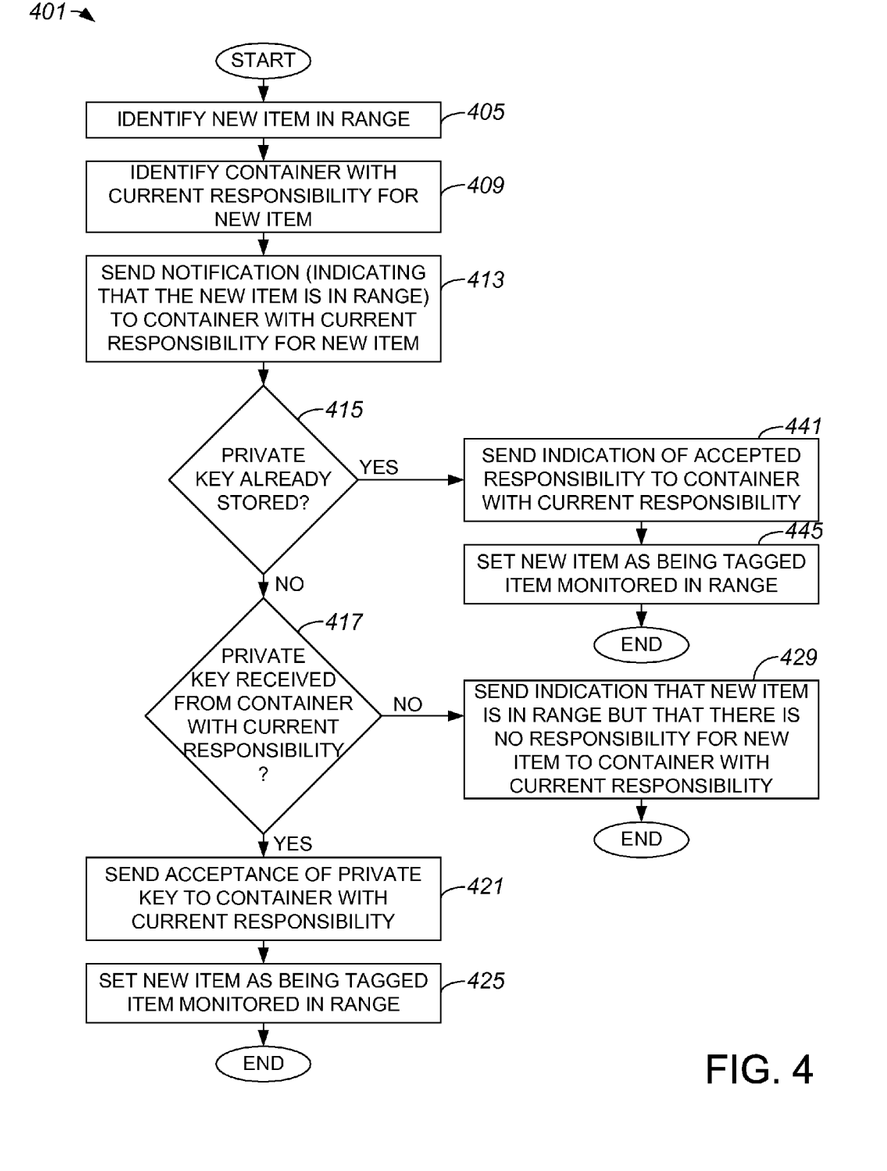
FIG. 4 is a process flow diagram which illustrates a process of acquiring responsibility for a tagged item in accordance with an embodiment of the present invention.

FIG. 4 is a process flow diagram which illustrates a process of acquiring responsibility for a tagged item in accordance with an embodiment of the present invention. A process 401 of acquiring responsibility for a tagged item begins at step 405 in which a new tagged item is identified within range. That is, a particular container ascertains that a new tagged item has entered its monitoring range. The new tagged item may be, in one embodiment, a tagged item which has not recently been in the monitoring range of the particular container. Then, in step 409, the container which has current responsibility for the tagged item is identified. Such an identification may be made, for example, when the container with current responsibility sends a broadcast message seeking information regarding the current location of the tagged item.

After the container which has current responsibility for the tagged item is identified, a notification is sent to the container which has current responsibility for the new tagged item in step 413. In other words, an indication that the tagged item is in the range associated with a particular container is transmitted to the container which has current responsibility.

A determination is made in step 415 regarding whether a private key for the tagged item is already stored with respect to the particular container. The private key may be stored in an information store of the particular container if the new tagged item had been monitored by the particular container at a previous time. If it is determined in step 415 that the private key is already stored, an indication that the particular container has accepted responsibility for monitoring the tagged item is provided to the container which has current responsibility is sent in step 441. Upon sending the indication, the particular container may assume responsibility for the tagged item in step 445. That is, the tagged item is effectively set as being monitored by the particular container. The process of acquiring responsibility for the new tagged item is completed once the particular container takes responsibility for the tagged item.

Returning to step 415, if it is determined that the private key is not already stored by the particular container, it is then determined in step 417 whether a private key has been received from the container which has current responsibility. If it is determined that no private key has been received, an indication that the tagged item is in the range of the particular container, but has no responsibility for monitoring the tagged item, is sent in step 429 to the container which has current responsibility. After the indication is sent, the process of acquiring responsibility for the new tagged item is completed.

Alternatively, if the determination in step 417 is that a private key has been received from the container with current responsibility, an acceptance of the private key is sent to the container with current responsibility in step 421. Once the acceptance is sent, the tagged item is effectively set as being monitored by the particular container in step 425, i.e., the particular container takes responsibility for monitoring the tagged item, and the process of acquiring responsibility for the new tagged item is completed.

A first container that has ownership or monitoring responsibility for a tagged item may transfer ownership to a second container. Subsequently, the second container may transfer ownership to still another container. Generally, when the second container receives a request to provide information to the first container regarding the effective location of the tagged item, the first container may contact the second container to determine whether the second container still has responsibility for the tagged item, or whether the second container has transferred responsibility for the tagged item to still another container.

Figure 5:
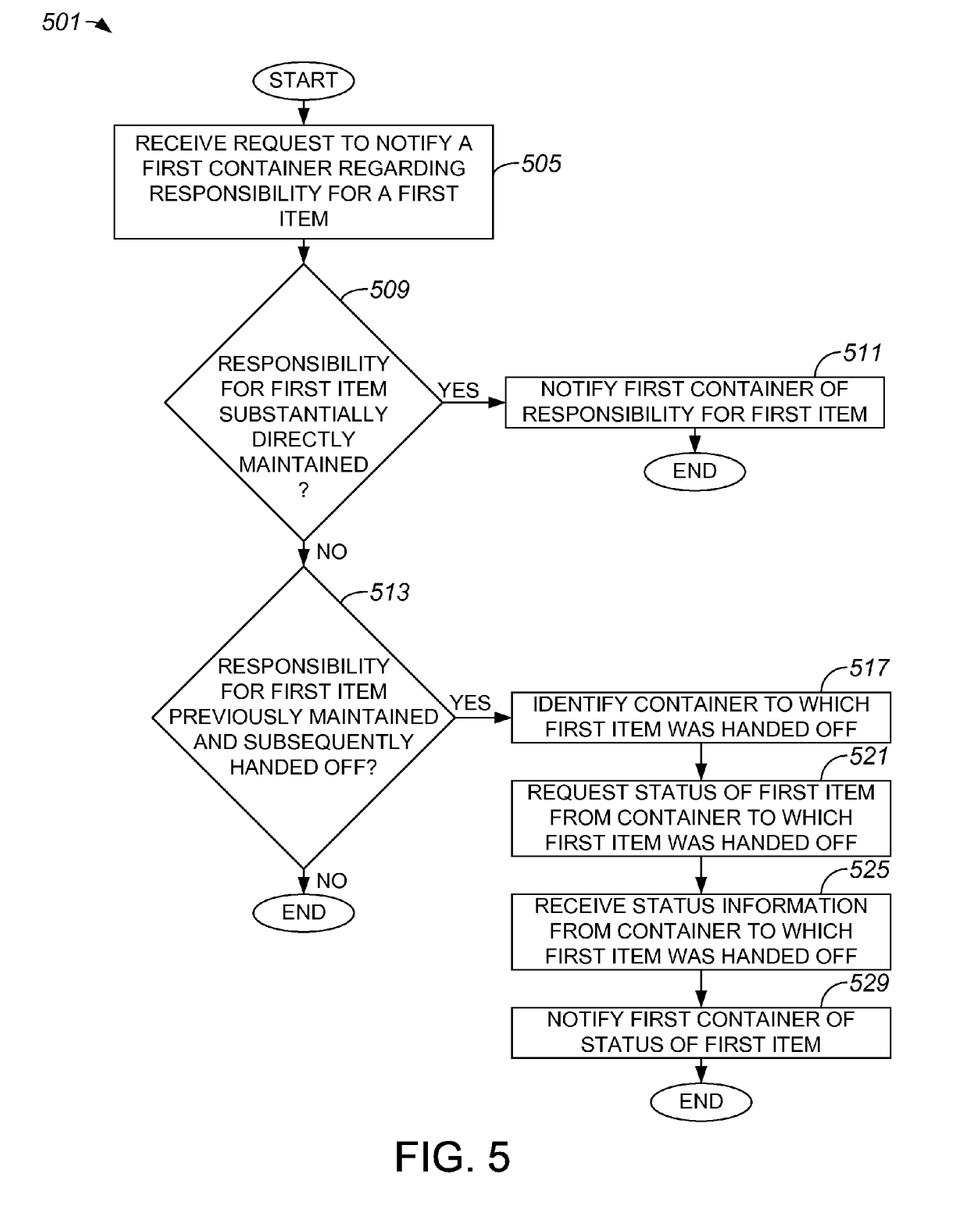
FIG. 5 is a process flow diagram which illustrates a method of processing a request to provide a notification regarding responsibility for a tagged item in accordance with an embodiment of the present invention.

FIG. 5 is a process flow diagram which illustrates a method of processing a request to provide a notification regarding responsibility for a tagged item in accordance with an embodiment of the present invention. A method 501 of processing a request to provide a notification begins at step 505 in which a request to notify a first container regarding responsibility for a first item is received, e.g., by a second container. In one embodiment, the first container previously had ownership or monitoring responsibility for the first item.

After the request for notification is received, it is determined in step 509 if monitoring responsibility for the first item is substantially directly maintained by a second container. The second container may search in an information store or a log to ascertain whether it substantially directly retains monitoring responsibility for the first item. If it is determined that monitoring responsibility for the first item is substantially directly maintained by the second container, the second container notifies the first container regarding responsibility for the first item in step 511, and the processing of a request to provide a notification is completed.

Alternatively, if it is determined in step 509 that monitoring responsibility for the first item is not substantially directly maintained by the second container, the indication may be that the second container previously maintained monitoring responsibility, but that the second container has handed off or otherwise transferred the monitoring responsibility to another container. As such, process flow moves from step 509 to step 513 in which it is determined that responsibility for the first item was previously maintained but was subsequently handed off. Such a determination may be made by checking an information store or log maintained by the second container.

If it is determined that responsibility for the first item was not previously maintained and subsequently handed off, the indication is that the second container has not had responsibility for the first item for at least a predetermined amount of time. In one embodiment, the second container may never have had responsibility for the first item. The method of processing a request is completed if it is determined that responsibility for the first item was not previously maintained by the second container and subsequently handed off.

On the other hand, if it is determined that the second container had responsibility and subsequently handed off responsibility, then process flow moves to step 517 in which the container to which the first item was handed off by the second container is identified. Such an identification may be made by accessing an information store or log. Once the container to which monitoring responsibility for the first item was transferred is identified, the second container may request the status of the first item in step 521 from the container to which monitoring responsibility for the first item was transferred. It should be appreciated that the container to which monitoring responsibility for the first item was transferred by the second container may also have handed off the first item, in which case that container may request the status of the first item from appropriate other containers.

In step 525, status information from the container to which the first item was handed off is received. Such status information may be received directly from the container to which the first item was handed off, and may indicate that the first item is either being directly or indirectly monitored by that container. After the status information is obtained, the first container is notified of the status of the first item in step 529. The second container generally sends an indication to the first container which indicates the status of the first item that was obtained in step 525. The method of processing a request is completed once the status of the first item is provided to the first container.

Figure 6A:
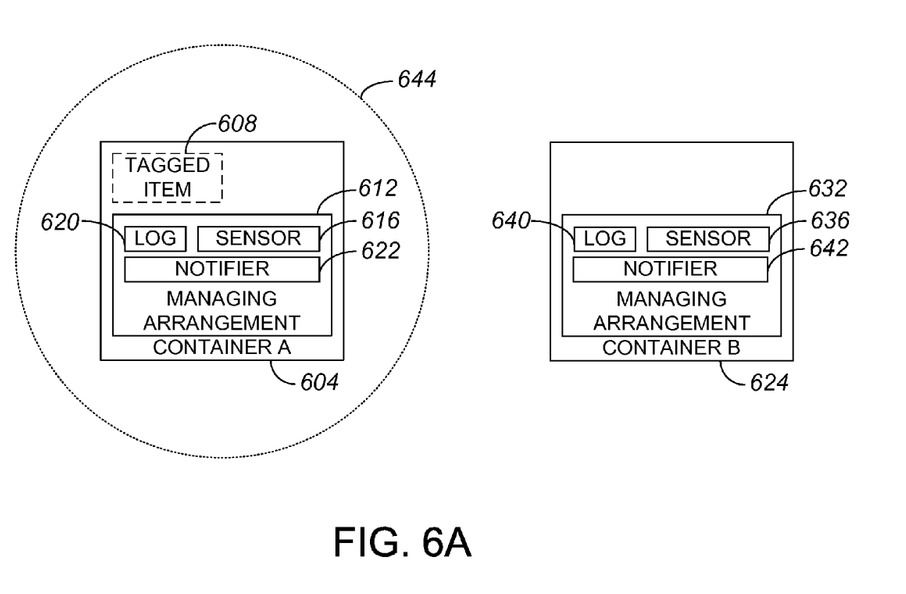
FIG. 6A is a diagrammatic representation of an overall tracking system when a tagged item is contained by a first container at a time t1 in accordance with an embodiment of the present invention.

With reference to FIGS. 6A-D, a timeline associated with transferring ownership, e.g., transferring monitoring responsibility, of a tagged item from a first container to a second container will be described. FIG. 6A is a diagrammatic representation of an overall tracking system when a tagged item is contained by a first container at a time t1 in accordance with an embodiment of the present invention. An overall tracking system includes a container 'A' 604 and a container 'B' 624. Container 'A' 604 includes a managing arrangement 612, and holds a tagged item 608 at a time t1. Container 'A' 604 has a optional range 644 that, as shown, extends past the boundaries associated with container 'A' 604. Hence, when tagged item 608 is in container 'A' 604 or within range 644, managing arrangement 612 has ownership of, or monitoring responsibility for, tagged item 608. It should be appreciated that in some instances, range 644 may coincide with the boundaries or edges of container 'A' 604.

As will be described in more detail below with respect to FIG. 9, managing arrangement 612 includes a sensor 616, which may be a detecting or sensing arrangement, configured to monitor the location of tagged item 608, a log 620 which maintains information relating to any containers to which responsibility for tagged item 608 may be transferred, and a notifier 622 that may be used to notify container a 604 if tagged item 608 moves out of container 'A' 604 and/or range 608. Like managing arrangement 612, a managing arrangement 632 of container 'B' 624 includes a sensor 636, a log 640, and a notifier 642.

Figure 6B:
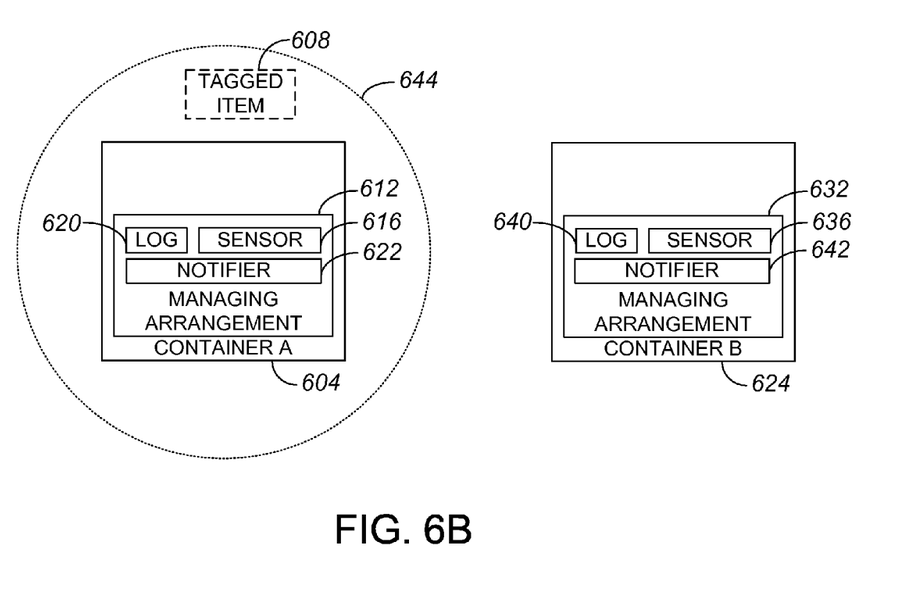
FIG. 6B is a diagrammatic representation of an overall tracking system when a tagged item is within a range associated with a first container at a time t2 in accordance with an embodiment of the present invention.

At a time t2, tagged item 608 moves out of container 'A' 604, but remains within range 644, as shown in FIG. 6B. As such, managing arrangement 612 continues to monitor tagged item 608. In the described embodiment, notifier 622 may issue a notification that indicates to container a 604 that tagged item 608, while still within range 644, is no longer within container 'A' 604.

Figure 6C:
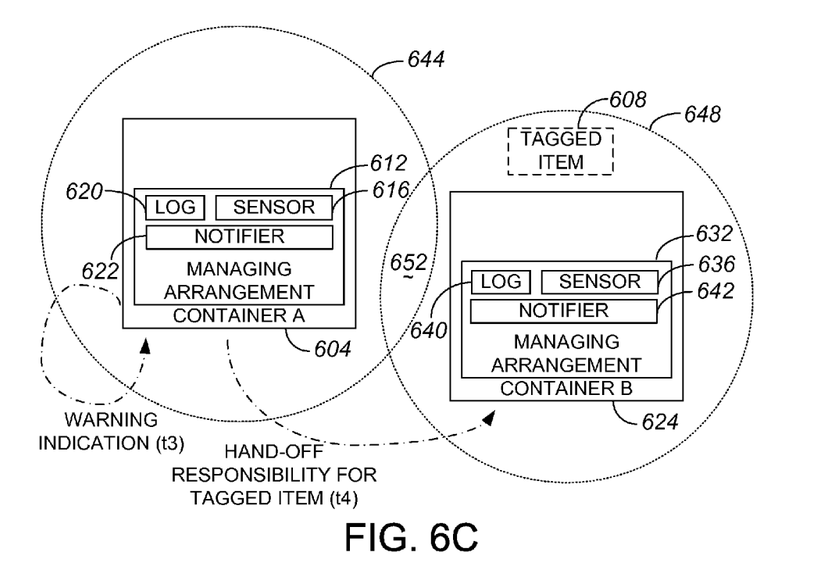
FIG. 6C is a diagrammatic representation of an overall tracking system when a tagged item has moved within a range associated with a second container at a time t3 and at a time t4 in accordance with an embodiment of the present invention.

At a time t3, tagged item 608 moves into a range associated with container 'B' 624. FIG. 6C is a diagrammatic representation of the overall tracking system when tagged item 608 has moved within a range 648 associated with container 'B' 624 at a time t3 and at a time t4 in accordance with an embodiment of the present invention. At a time t3, sensor 612 effectively senses that tagged item 608 is out of range 644. Hence, notifier 622 may generate a warning notification which effectively warns container 'A' 604 that tagged item 608 has transitioned out of range 644. At a time t4, managing arrangement 612 may determine that tagged item 608 is in range 648 associated with container 'B' 624' and, therefore, hand off responsibility for monitoring tagged item 608 to managing arrangement 632. Managing arrangement 612 may store an indication of the hand off of responsibility into log 620. When responsibility for tagged item 608 is handed off to managing arrangement 632, managing arrangement 632 may store information, e.g., a private key, relating to tagged item 608 into log 640.

As shown, range 644 overlaps range 648 at an overlap area 652. If tagged item 608 is within overlap area 652, the managing arrangement 612 which is currently monitoring tagged item 608 maintains responsibility for tagged item 608. By way of example, if tagged item 608 moved through overlap area 652 before managing arrangement 612 handed off responsibility of tagged item 608 to managing arrangement 632, managing arrangement 612 maintained responsibility for tagged item 608 while tagged item was in overlap area 652.

Figure 6D:
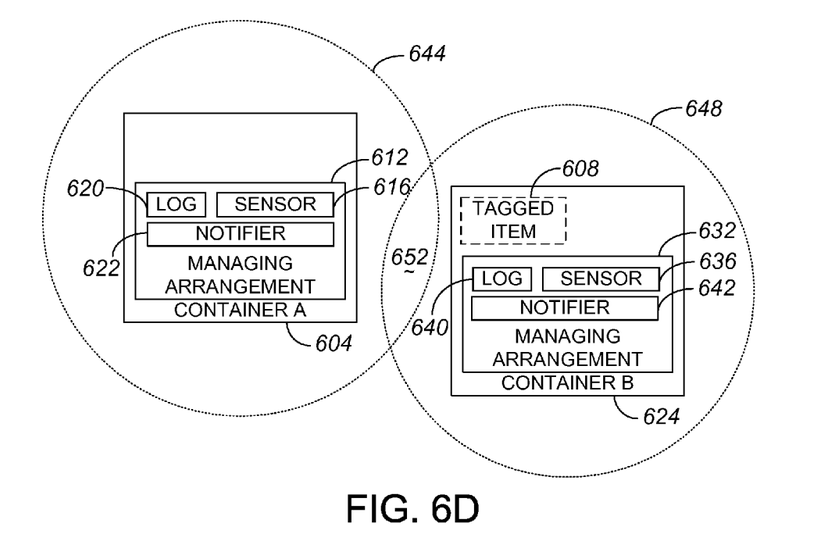
FIG. 6D is a diagrammatic representation of an overall tracking system when a tagged item has moved into a second container at a time t5 in accordance with an embodiment of the present invention.

FIG. 6D is a diagrammatic representation of the overall tracking system when tagged item 608 has moved into container 'B' 624 at a time t5 in accordance with an embodiment of the present invention. In the described embodiment, range 648 extends past the boundaries of container 'B' 624, although it should be appreciated that range 648 may be substantially coincident with the boundaries of container 'B' 624. When tagged item 608 moves from range 648 into container 'B' 624, sensor 636 may sense the movement, and notifier 642 may send a notification to container 'B' 624 regarding the change. However, if range 648 is substantially coincident with the boundaries of container 'B' 624, such a notification by notifier 642 is typically unnecessary.

Figure 7:
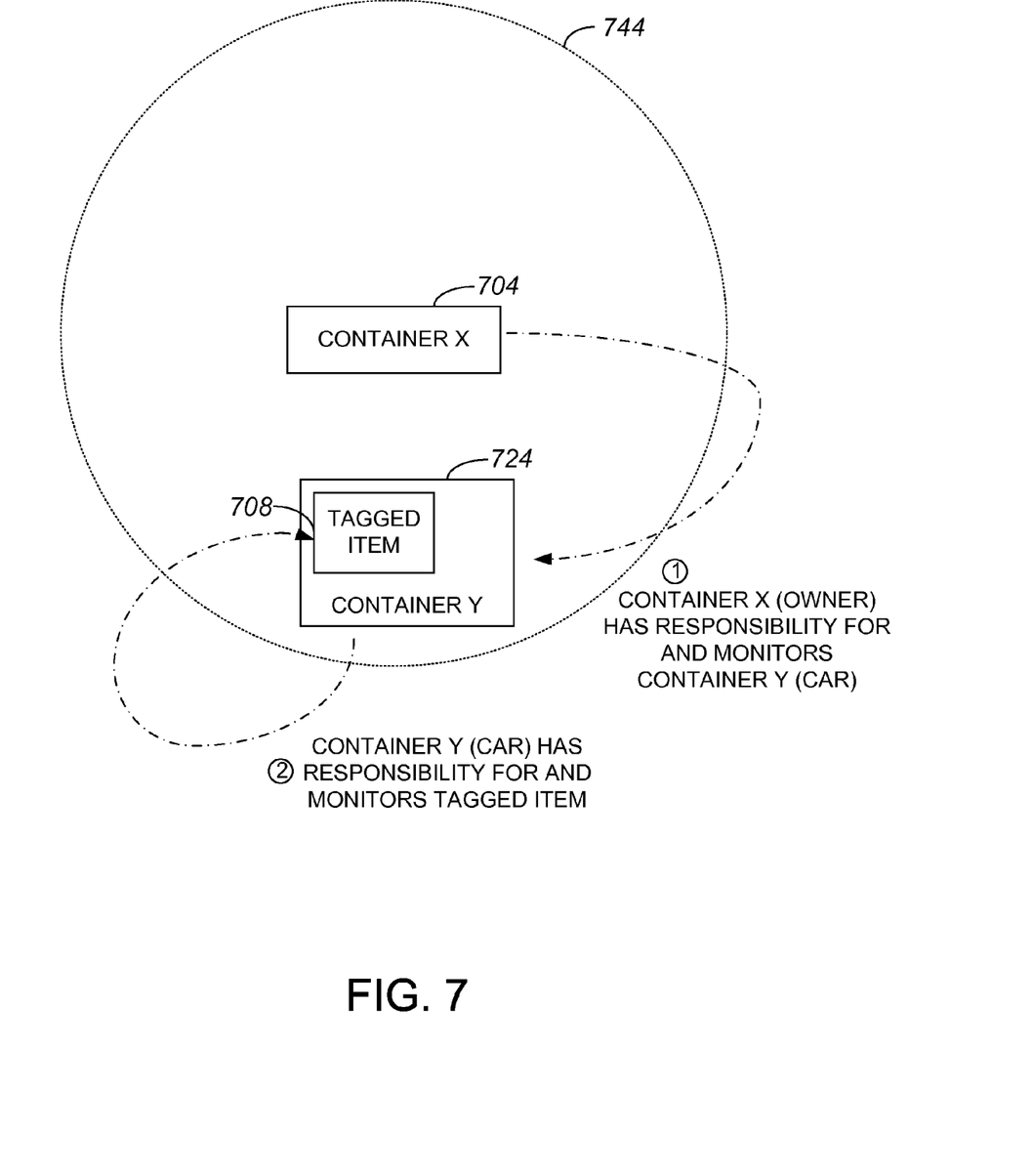
FIG. 7 is a diagrammatic representation of a system in which multiple tracking layers are implemented in accordance with an embodiment of the present invention.

A tracking system may include a plurality of tracking layers. For example, a tracking system may be configured such that a container in a highest layer may have monitoring responsibility for a container in a middle layer, while that container has monitoring responsibility for a tagged item that is owned by an owner or user of the container in the highest layer. FIG. 7 is a diagrammatic representation of a system in which multiple tracking layers are implemented in accordance with an embodiment of the present invention. A container 'X' 704 has a monitoring range 744. A container 'Y' 724, which is associated with a second tracking layer, is effectively located within range 744. Container 'Y' 724 has monitoring for responsibility for a tagged item 708, which is associated with a third tracking layer.

In the described embodiment, container 'X' 704 may be interested in effectively monitoring tagged item 708. For container 'X' 704 to effectively monitor tagged item 708, container 'X' 704 obtains current information regarding tagged item 708 from container 'Y' 724. For example, if container 'X' 724 is associated with a person who owns tagged item 708, which is a portable electronic device, then container 'Y' 724 may be a car in which the portable electronic device is located. The car may monitor the portable electronic device, and the person may monitor the car. Hence, when the car is out of range 744, the person may be notified, while when the portable electronic device is no longer in the car, the car may cause a notification to be sent to the person.

Figure 8:
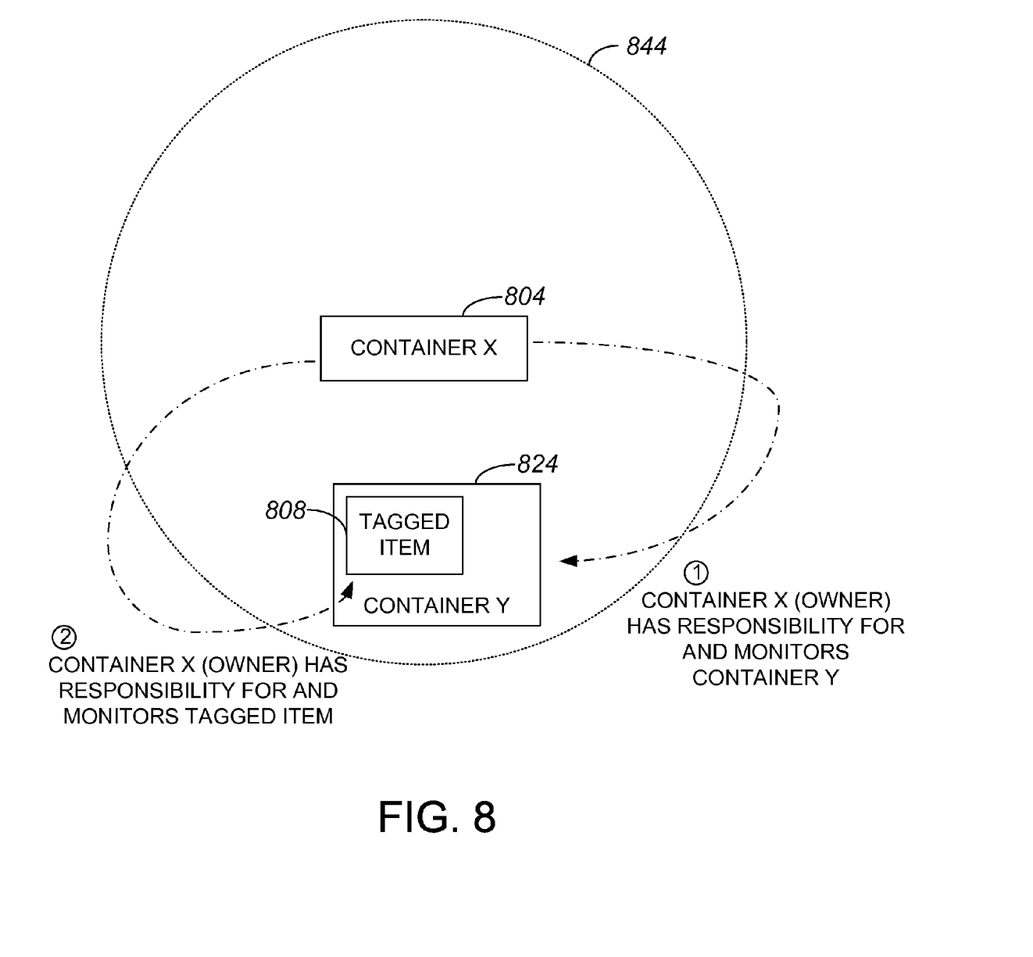
FIG. 8 is a diagrammatic representation of a system in which a single tracking layer is implemented in accordance with an embodiment of the present invention.

Instead of having multiple tracking layers, a tracking system may essentially be such that each substantially all items are tracked as being in the same tracking level. In one embodiment, even when a tagged item is located within a container, another container may have monitoring responsibility for the tagged item. FIG. 8 is a diagrammatic representation of a system in which a single tracking layer is implemented in accordance with an embodiment of the present invention. A container 'X' 804 has a monitoring range 844 within which a container 'Y' 824 is located. As such, container 'X' 804 has monitoring responsibility for container 'Y' 824. A tagged item 808, which belongs to container 'X' 804, is located in container 'Y' 824. Container 'X' 804 has monitoring responsibility for tagged item 808 and for container 'Y' 824, even though tagged item 808 is effectively nested within container 'Y' 824. Hence, tagged item 808 and container 'Y' 824 are in the same tracking layer, even though tagged item 808 may be contained within container 'Y' 824.

Figure 9:
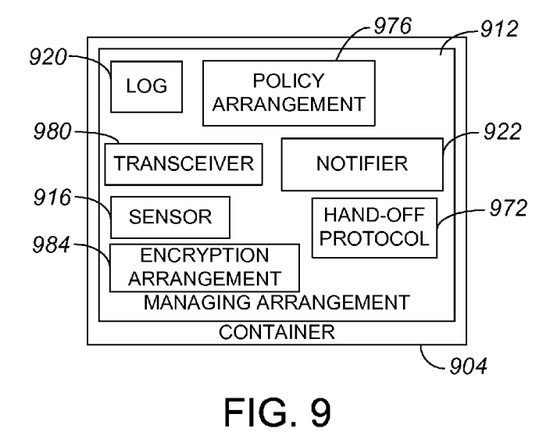
FIG. 9 is a block diagram representation of a container which includes a managing arrangement associated with a tracking system in accordance with an embodiment of the present invention.

Referring next to FIG. 9, the components associated with a managing arrangement that is a part of a container will be described in accordance with an embodiment of the present invention. A managing arrangement 912 is associated with a container 904, and effectively provides container 904 with the capability of monitoring tagged items (not shown). Managing arrangement 912 may include hardware and/or executable software logic embodied in a tangible media. In one embodiment, managing arrangement 912 may be a computing device, e.g., portable computing device.

Managing arrangement 912 includes a sensor 916 which is arranged to detect when a tagged item (not shown) is within a monitoring range of container 904. Sensor 916 may be an RF sensor that is arranged to sense when a RFID tag, i.e., and RFID tag associated with a tagged item (not shown) is within the range of container 904. A log 920, or an information store, in managing arrangement 912 is arranged to store information regarding which tagged items (not shown) are within the monitoring range of container 904, private keys associated with the tagged items, which tagged items have been handed off by managing arrangement 912, and/or the identity of containers (not shown) to which tagged items have been handed off. Log 920 may also store information regarding containers (not shown) which are considered as being trusted by container 904.

A notifier 922 of managing arrangement 912 is configured to provide a notification or alert, e.g., substantially automatically, which indicates that a tagged item (not shown) that is owned by or being monitored by managing arrangement 912 has moved out of the monitoring range of container 904. The notification may include, but is not limited to including, generating audio alarms, initiating phone calls, and initiating e-mails. In one embodiment, notifier 922 may also provide an alert when a tagged item has entered the monitoring range of container 904. A policy arrangement 976 sets policies which may be used by notifier 922 to determine how to alert an owner that a tagged item (not shown) is out of a monitoring range of container 904. Policy arrangement 976 may also specify types of containers (not shown) that are considered to be trusted, as well as how new containers and new tagged items (not shown) may initially register with managing device 912.

A hand-off protocol 972 specifies how a hand-off, or a transfer of ownership, is effectuated. By way of example, hand-off protocol 972 may specify when and how to hand-off monitoring responsibility of a tagged item (not shown) to another container (not shown), as well as how to determine whether a particular container is suitable for accepting monitoring responsibility.

Managing arrangement 912 also includes an encryption arrangement 984 which encrypts communications between managing arrangement 912 and tagged items (not shown), as well as communications between managing arrangement 912 and containers (not shown). Encryption arrangement 984 may use any suitable encryption algorithm to encrypt information to be sent using a transceiver 980, as well as to decrypt information received or otherwise obtained through transceiver 980. Transceiver 980 is arranged to send and to receive information from tagged items (not shown) and other containers (not shown). In one embodiment, transceiver 980 is arranged to send and to receive RF communications or WiFi communications, although it should be appreciated that transceiver 980 may be configured to send and to receive any suitable communications.

Figure 10:
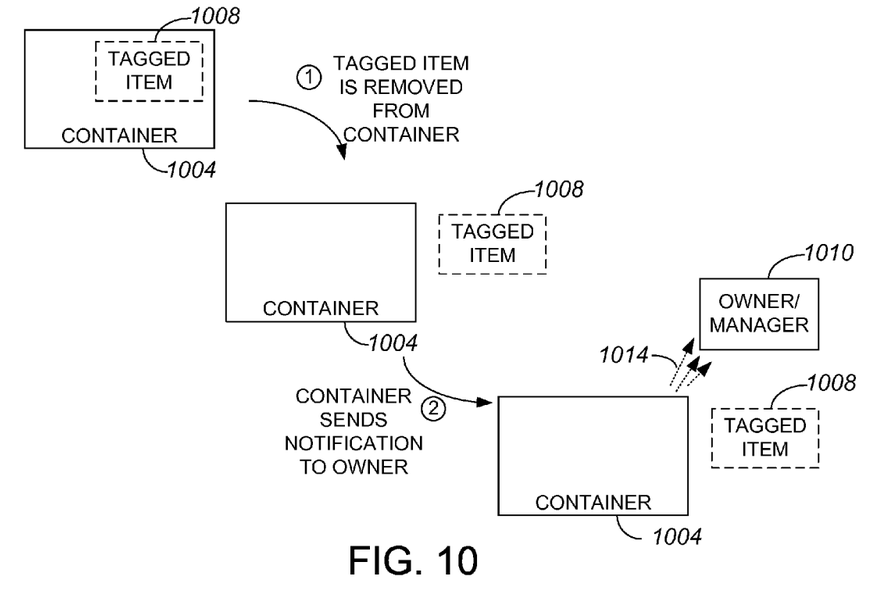
FIG. 10 is a diagrammatic representation of a process of notifying an owner that a tagged item has been removed from a trusted container in accordance with an embodiment of the present invention.

As discussed above, an owner of a portable device with a locator tag or a unique identifier may be notified when the portable device moves out of range of a trusted container. FIG. 10 is a diagrammatic representation of a process of notifying an owner that an item that has been tagged with a locator tag has been removed from a trusted container in accordance with an embodiment of the present invention. A tagged item 1008 is located in a monitoring range associated with a container 1004 such that container 1004 is effectively responsible for tagged item 1008. In the described embodiment, the monitoring range of container 1004 corresponds to the physical boundaries of container 1004. It should be appreciated, however, that the monitoring range may not necessarily correspond to the physical boundaries of container 1004. By way of example, the monitoring range may extend past the physical boundaries of container 1004. After tagged item 1008 is removed from container 1004, container 1004 may send a notification to an owner or a managing device 1010.

Although only a few embodiments of the present invention have been described, it should be understood that the present invention may be embodied in many other specific forms without departing from the spirit or the scope of the present invention. By way of example, a tracking system which includes multiple tracking layers may include any number of tracking layers. While a tracking system which includes up to three tracking layers has been described above, a tracking system is not limited to three tracking layers.

In one embodiment, a managing arrangement or device may be arranged to substantially manually "unregister" a tagged item that an owner has purposefully relinquished. For instance, if an owner sells the tagged item, the owner may remove the tagged item from the responsibility of the managing arrangement.

A tracking system may generally be used to identify a tagged item that is within a particular area. For example, if an owner of a tagged item has lost or misplaced the tagged item, the owner may provide a private key associated with the tagged item to substantially all trusted containers within an overall network. When the tagged item enters a range associated with one of the trusted containers, that trusted container may effectively recognize the private key for the tagged item and, hence, alert the owner that the tagged item has been located.

While a tagged item has been described as a portable electronic device which has an RFID tag and/or a WiFi transmitter, a tagged item is not limited to being a portable electronic device. For instance, an owner may place a tag in his/her purse or wallet such that a tracking system may monitor the purse or wallet. An owner may also incorporate a tag into his/her watch or onto his/her jewelry. In general, a tagged item may be substantially any item that an owner wishes to effectively track such that when the tagged item is moved out of a particular range, the owner may be notified.

Further, a tagged item may be substantially any item which includes a locator tag that is suitable for being tracked. A tagged item may be a portable electronic device on which data is stored, such as a laptop computer, a smart phone, a mobile phone, a digital media player, or a peripheral computer component. However, a tagged item is not limited to being a portable electronic device. By way of example, the tagged item may be a computer memory element such as a flash memory card or a memory device with a USB interface. A tagged item may generally be any portable item, electronic or otherwise, into or onto which a locator tag may be incorporated. The locator tag may, in one embodiment, be integrated within an electronic device.

In one embodiment, a container may be associated with a plurality of different ranges and, hence, different levels of notification. By way of example, a container that is a box may have a first range that is defined by the physical edges or boundaries of box and a second range that is defined from the physical edges of the box outwards to a particular distance. When a tagged item transitions from the first range to the second range, a first level of notification may be provided, e.g., a lower level notification may be provided as the tagged item is still within a range associated with the container. When the tagged item transitions out of the second range, a second level of notification may be provided, e.g., a higher level notification may be provided as the tagged item has left all ranges associated with the container.

A tagged item and/or a container may be jointly owned. When a tagged item is jointly owned, the transition of the tagged item between monitoring ranges associated with the plurality of owners may substantially be transparent. In other words, the transition of a jointly owned tagged item between owners may not necessarily result in notifications being sent.

The steps associated with the methods of the present invention may vary widely. Steps may be added, removed, altered, combined, and reordered without departing from the spirit of the scope of the present invention. For example, if a private key is not accepted by a trusted container during the course of transferring ownership of a tagged item, the private key may be resent to the trusted container for a predetermined number of times before the trusted container is considered as rejecting acceptance of the private key. When the trusted container rejects the private key, then responsibility for the tagged item is not transferred to the trusted container.

In one embodiment, a container which currently has direct monitoring responsibility for a tagged item is configured to substantially directly provide information regarding the location of the tagged item to an original requester, e.g., the original owner of the tagged item, even if the original requester does not directly request the information from the container.

Although broadcasting a message that requests notification from a container with a range within which a tagged item is located has been described, such a notification may instead be unicasted or otherwise sent to specific containers. The specific containers may be known to be likely to have ranges within which the tagged item is located. Therefore, the present examples are to be considered as illustrative and not restrictive, and the invention is not to be limited to the details given herein, but may be modified within the scope of the appended claims.

What is claimed is:

1. A method comprising:
maintaining responsibility for a first item when the first item is in a first range of a first container, the first item having a locator tag, wherein maintaining responsibility for the first item includes monitoring the locator tag when the locator tag is within the first range;
determining when the first item is in the first range;
determining if the first item is in a second range associated with a second container when it is determined that the first item is not in the first range;
determining if the second container is trusted with respect to the first container if it is determined that the first item is in the second range associated with the second container; and
transferring responsibility for the first item to the second container if it is determined that the second container is trusted with respect to the first container.

2. The method of claim 1 wherein transferring responsibility for the first item to the second container includes transferring responsibility for the first item to the second container from the first container.

3. The method of claim 2 wherein transferring responsibility for the first item to the second container from the first container includes:
providing a private key to the second container, the private key being arranged to identify the first item; and
logging an indication that responsibility for the first item is transferred to the second container, wherein logging the indication includes logging the information in an information store of the first container.

4. The method of claim 3 further including obtaining an indication that responsibility for the first item is accepted by the second container.

5. The method of claim 3 wherein providing the private key to the second container includes sending the private key from the first container to the second container.

6. The method of claim 1 wherein if it is determined that the first item is not in the first range, the method further includes automatically generating a notification which is arranged to indicate that the first item is not in the first range.

7. The method of claim 1 wherein the first range is defined by edges associated with the first container and the second range is defined by edges associated with the second container.

8. The method of claim 1 wherein the locator tag is an RFID tag.

9. The method of claim 1 wherein if it is determined that the first item is in the first range, the method further includes:
determining when the first item is also in a third range associated with a third container, wherein the third container has responsibility for the first container;
transferring responsibility for the first item to the third container when it is determined that the first item is also in the third range associated with the third container.

10. The method of claim 1 wherein if it is determined that the first item is in the first range, the method further includes:
determining when the first item is also in a third range associated with a third container, wherein the third container has responsibility for the first container;
transferring responsibility for the first item to the third container when it is determined that the first item is also in the third range associated with the third container.

11. The method of claim 1 wherein if it is determined that the second container is not trusted with respect to the first container, the method further includes:
determining whether it is possible to designate the second container as trusted;
designating the first item as not being in the range of a trusted container when it is determined that it is not possible to designate the second container as trusted;
designating the second container as trusted when it is determined that it is possible to designated the second container as trusted; and
transferring responsibility for the first item to the second container after designating the second container as trusted.

12. Logic encoded in one or more tangible, non-transitory computer-readable media for execution and when executed operable to:
maintain responsibility for a first item when the first item is in a first range of a first container, the first item having a locator tag, wherein the logic operable to maintain responsibility for the first item includes logic operable to monitor the locator tag when the locator tag is within the first range;
determine when the first item is in the first range;
determine if the first item is in a second range associated with a second container when it is determined that the first item is not in the first range;
determine if the second container is trusted with respect to the first container if it is determined that the first item is in the second range associated with the second container; and
transfer responsibility for the first item to the second container if it is determined that the second container is trusted with respect to the first container.

13. The logic of claim 12 wherein the logic operable to transfer responsibility for the first item to the second container includes logic operable to transfer responsibility for the first item to the second container from the first container.

14. The logic of claim 13 wherein the logic operable to transfer responsibility for the first item to the second container from the first container is further operable to:
provide a private key to the second container, the private key being arranged to identify the first item; and
log an indication that responsibility for the first item is transferred to the second container, wherein the logic further operable to log the indication is further operable to log the information in an information store of the first container.

15. The logic of claim 14 further operable to obtain an indication that responsibility for the first item is accepted by the second container.

16. The logic of claim 14 wherein the logic operable to provide the private key to the second container is further operable to send the private key from the first container to the second container.

17. The logic of claim 12 wherein the logic is further operable to automatically generate a notification which is arranged to indicate that the first item is not in the first range if it is determined that the first item is not in the first range.

18. The logic of claim 12 wherein the first range is defined by boundaries associated with the first container and the second range is defined by boundaries associated with the second container.

19. The logic of claim 12 wherein the locator tag is an RFID tag.

20. An apparatus comprising:
means for maintaining responsibility for a first item when the first item is in a first range of a first container, the first item having a locator tag, wherein the means for maintaining responsibility for the first item include means for monitoring the locator tag when the locator tag is within the first range;
means for determining when the first item is in the first range;
means for determining if the first item is in a second range associated with a second container when it is determined that the first item is not in the first range;
means for determining if the second container is trusted with respect to the first container if it is determined that the first item is in the second range associated with the second container; and
means for transferring responsibility for the first item to the second container if it is determined that the second container is trusted with respect to the first container.

21. A method comprising:
ascertaining that a first item is not present within a first range monitored by a first container arrangement, wherein the first container arrangement has a responsibility for monitoring the first item when the first item is present within the first range;
transmitting a message intended to locate a second container arrangement associated with a second range, wherein the first item is present within the second range;
determining if an indication is received from the second container arrangement in response to the message, the indication being arranged to indicate at least that the first item is present within the second range;
determining when the indication also indicates that the second container arrangement has accepted responsibility for the first item;
handing off the responsibility for monitoring the first item to the second container arrangement if the indication is received and when it is determined that the indication also indicates that the second container arrangement has accepted the responsibility for the first item; and
at least temporarily maintaining the responsibility for monitoring the first item using the first container arrangement if the indication is received and when it is determined that the indication does not also indicate that the second container arrangement has accepted the responsibility for the first item.

22. The method of claim 21 wherein handing off the responsibility for monitoring the first item to the second container arrangement includes providing a key to the second container arrangement and logging the first item with respect to the first container arrangement as not being monitored by the first container arrangement.

23. Logic encoded in one or more tangible, non-transitory computer-readable media for execution and when executed operable to:
ascertain that a first item is not present within a first range monitored by a first container arrangement, wherein the first container arrangement has a responsibility for monitoring the first item when the first item is present within the first range;
transmit a message intended to locate a second container arrangement associated with a second range, wherein the first item is present within the second range;
determine if an indication is received from the second container arrangement in response to the message, the indication being arranged to indicate at least that the first item is present within the second range;
determine when the indication also indicates that the second container arrangement has accepted responsibility for the first item;
hand off the responsibility for monitoring the first item to the second container arrangement if the indication is received and when it is determined that the indication also indicates that the second container arrangement has accepted the responsibility for the first item; and
at least temporarily maintain the responsibility for monitoring the first item using the first container arrangement if the indication is received and when it is determined that the indication does not also indicate that the second container arrangement has accepted the responsibility for the first item.

24. The logic of claim 23 wherein the logic operable to hand off the responsibility for monitoring the first item to the second container arrangement is further operable to provide a key to the second container arrangement and logging the first item with respect to the first container arrangement as not being monitored by the first container arrangement.

* * * * *